United States Patent Office 3,352,744
Patented Nov. 14, 1967

3,352,744
SELF-EXTINGUISHING PHENOLIC RESIN COMPOSITIONS AND LAMINATES PREPARED THEREFROM
Curtis Elmer, Kirkwood, Mo., and Jerome J. Mestdagh, Lockport, Ill., assignors to Monsanto Company, St. Louis, Mo., a corporation of Delaware
No Drawing. Filed May 21, 1965, Ser. No. 457,859
3 Claims. (Cl. 161—264)

This application is a continuation in part of copending application Serial No. 122,621, filed July 10, 1961, now abandoned.

This invention relates to self-extinguishing phenolic resin compositions and more particularly relates to a novel flame-retardant system which is capable of rendering phenolic resins self-extinguishing with a minimum accompanying degradation of resin properties which are normally degraded by flame retardants.

Many materials have been proposed for use as flame retardants in phenolic resin compositions and have been found to be effective in rendering the compositions self-extinguishing. In some cases, the fact that the flame retardants cause considerable degradation of various resin properties has been relatively unimportant; in other cases, e.g., when a phenolic resin is to be employed in an electrical application, the degradation of resin properties by flame retardants has been a serious problem.

Electrical applications for phenolic resin-impregnated laminates usually have rather stringent property requirements. It is, of course, rather pointless to render a phenolic resin self-extinguishing for use in a laminate intended for an electrical application if the incorporation of sufficient flame retardant to render the resin self-extinguishing will raise the dielectric constant and power factor of the phenolic resin-impregnated laminate to levels which will prevent the use of the laminate in the electrical application for which it was intended. For this and similar reasons, it would obviously be advantageous to provide a flame retardant or flame-retardant system which would be capable of rendering phenolic resins self-extinguishing with a minimum accompanying degradation of properties which are normally degraded by flame retardants.

An object of the invention is to provide novel self-extinguishing phenolic resin compositions.

Another object is to provide self-extinguishing phenolic resin compositions which can be used in preparing laminates having good electrical properties.

A further object of this invention is to provide flame retardant laminates.

These and other objects are attained by intimately mixing with a particular phenolic resin a flame-retardant system consisting of (1) 5–60%, based on the weight of the phenolic resin, of a chlorinated polyphenyl having no flash point below its boiling point and (2) 3–40%, based on the weight of the phenolic resin, of a phosphate of the group consisting of:

(a), (b), (c)

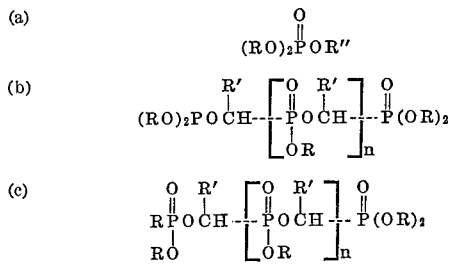

and (d) mixtures thereof; wherein each of the above formulas R and R" representing a haloalkyl radical containing 2–3 carbon atoms, R' representing an alkyl radical containing 1–3 carbon atoms, and $n$ representing an average numerical value of 0–4. The particular phenolic resin employed herein is prepared by the process of reacting phenol and styrene and then reacting the reaction product with a vegetable drying oil and then reacting the reaction thereof with an aldehyde under certain conditions. The particular phenolic resin system with the flame retardant material is suitable for preparing laminates having excellent flame retardant properties.

The following examples are given to illustrate the invention. Quantities mentioned in the examples, unless otherwise specified, are given on a weight basis.

EXAMPLE I

*Preparation of phenolic resins*

RESIN A

Charge 20 parts of phenol, 80 parts of cresylic acid, 3 parts of hexamethylenetetramine, and 50 parts of tung oil to a suitable reaction vessel. Heat the mixture to 160° C. After maintaining the temperature at 160° C. for 3 hours, cool to 40° C., add 75 parts of formalin (37% formaldehyde), and heat the batch to an atmospheric boil. Maintain the atmospheric boil for 285 minutes. Now cool the reaction mixture and dehydrate under a vacuum of 27 inches of mercury until the batch temperature rises to 80° C. Add 30 parts of toluene and 50 parts of ethanol, thoroughly mix, and cool..

RESIN B

Charge 100 parts of phenol and 0.3 part of concentrated sulfuric acid to a suitable reaction vessel, heat to about 65° C., and add 25 parts of styrene over a period of about 1 hour. Raise the temperature to 128° C. over a period of 30 minutes, add 70 parts of tung oil, and then raise the temperature to 160° C. After maintaining the temperature at 160° C. for 3 hours, cool to 80° C., add 5.5 parts of hexamethylenetetramine, continue cooling to 50° C., and add 75 parts of formalin (37% formaldehyde). Now heat the reaction mixture to a reflux under vacuum at 80° C., and continue refluxing for 120 minutes. Cool the batch and dehydrate under a vacuum of 27 inches of mercury until the temperature of the batch rises to 80° C. Add 80 parts of toluol and 40 parts of ethanol, thoroughly mix, and cool.

RESIN C

Charge 100 parts of phenol and 0.3 part of concentrated sulfuric acid to a suitable reaction vessel, heat to 89° C., and add 20 parts of styrene over a period of 45 minutes. Raise the temperature to 128° C. over a period of 30 minutes, add 70 parts of tung oil, and then raise the temperature to 160° C. After maintaining the temperature at 160° C. for 3 hours, cool to 99° C., add 6 parts of hexamethylenetetramine, continue cooling to 40° C., and add 75 parts of formalin (37% formaldehyde). Now heat the reaction mixture to a reflux under vacuum at 85° C., and continue refluxing for 40 minutes. Cool the batch and dehydrate under a vacuum of 27 inches of mercury until the temperature of the batch rises to 80° C. Add 40 parts of toluol and 40 parts of ethanol, thoroughly mix, and cool.

The following examples relate to modified varnishes prepared from the varnishes of Example I and to laminates prepared from the modified varnishes. For convenience in identification, only the particularly pertinent details of varnish solids content and laminate properties are defined in each of the examples. The processes employed in preparing the modified varnishes and laminates are shown below.

Preparation of varnishes

Each of the varnishes is prepared by intimately mixing a 50% solution of chlorinated polyphenyl in toluene and any other specified additives with one of the varnishes of Example I. The concentrations of additives indicated in each of the examples are based on the weight of resin solids.

The chlorinated polyphenyls employed in the varnishes are products obtained by chlorinating biphenyls and/or terphenyls. None of these chlorinated polyphenyls has a flash point below its boiling point. They are designated in the examples as follows:

(A) A chlorinated terphenyl containing 60% chlorine and having a distillation range of 280–335° C. at 5 mm. of mercury—a yellow, transparent resin.

(B) A chlorinated biphenyl containing 60% chlorine and having a distillation range of 385–420° C. at atmospheric pressure—a light yellow, soft, sticky resin.

(C) A chlorinated biphenyl/terphenyl (60:40) mixture containing 65% chlorine and having a distillation range of 230–320° C. at 4 mm. of mercury—a yellow, transparent, brittle resin.

Preparation of laminates

Each of the laminates of the following examples is prepared from the phenolic varnish of the particular example and a 10 mil electrical grade, cotton linters paper which has been pre-impregnated to a resin content of 14–18% with a commercially-available, low molecular weight, liquid phenol-formaldehyde resin.

Seven plies of the pre-impregnated paper are impregnated to a total resin content of 58–62% with the phenolic varnish of the particular example, dried, assembled, and cured by heating the assembly for about 30 minutes at 130–180° C. under a pressure of 1000/2500 p.s.i. to form a laminate having a thickness of about 1/16 inch. Properties of the laminates are determined as follows:

| | ASTM test |
|---|---|
| Self-extinguishing properties | D–635–56T |
| Electrical properties | D–150–54T |
| Punching (room temperature) | D–617–44 |

Where an electrical property is qualified as "D24/23," it should be understood as denoting the property of the laminate after it has been soaked in water for 24 hours at 23° C.

The following example demonstrates that concentrations of chlorinated polyphenyl as high as 43%, based on resin solids, are insufficient to render the phenolic resin-impregnated laminates self-extinguishing.

EXAMPLE II

Part A

Varnish solid: Resin A and 43% of chlorinated polyphenyl A.
Laminate properties: not self-extinguishing.

Part B

Varnish solids: Resin B and 40% of chlorinated polyphenyl C.
Laminate properties: not self-extinguishing.

Part C

Varnish solids: Resin C and 42% of chlorinated polyphenyl B.
Laminate properties: not self-extinguishing.

The following example demonstrates that an amount of chlorinated polyphenyl which is insufficient to render the resin-impregnated laminates self-extinguishing can be used in conjunction with one of the phosphates of the invention to reduce the amount of phosphate required to achieve any given level of flame-retardance, thus improving the electrical properties of the laminate at any given level of flame-retardance.

EXAMPLE III

Part A

Varnish solids: Resin B and 9.8% of bis(beta-bromoethyl) beta-chloroethyl phosphate.

Laminate properties:
| | |
|---|---|
| Self extinguishing time, seconds | 23 |
| Dielectric constant | 4.55 |
| Dielectric constant (D24/23) | 4.61 |
| Power factor | 0.0348 |
| Power factor (D24/23) | 0.0360 |
| Punching | 95 |

Part B

Varnish solids: Resin B, 19% of chlorinated polyphenyl A, and 9% of bis(beta-bromoethyl) beta-chloroethyl phosphate.

Laminate properties:
| | |
|---|---|
| Self-extinguishing time, seconds | 16 |
| Dielectric constant | 4.55 |
| Dielectric constant (D24/23) | 4.67 |
| Power factor | 0.0336 |
| Power factor (D24/23) | 0.0346 |
| Punching | 95 |

The following example demonstrates the effect of varying the concentrations of the components of a particular flame-retardant system.

EXAMPLE IV

Part A

Varnish solids: Resin A, 26% of chlorinated polyphenyl A, and 3.8% of a phosphate corresponding to the formula:

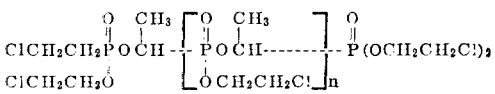

wherein $n$ has an average value of 1.

Laminate properties:
| | |
|---|---|
| Self-extinguishing time, seconds | 74 |
| Power factor | 0.028 |
| Power factor (D24/23) | 0.031 |

Part B

Varnish solids: Resin A, 19% of chlorinated polyphenyl A, and 9% of the phosphate employed in Part A.

Laminate properties:
| | |
|---|---|
| Self-extinguishing time, seconds | 11 |
| Power factor | 0.029 |
| Power factor (D24/23) | 0.031 |

Example V compares the efficiency as flame-retardant components of a phosphate containing chlorine as the only halogen and a phosphate containing both chlorine and bromine.

EXAMPLE V

Part A

Varnish solids: Resin C, 22% of chlorinated polyphenyl A, and 5% of the phosphate employed in Example IV.
Laminate properties: self-extinguishing time 22 seconds.

Part B

Varnish solids: Resin C, 22% of chlorinated polyphenyl A, and 5% of a phosphate corresponding to the formula:

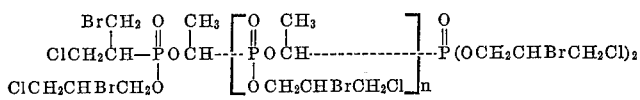

wherein $n$ has an average value of 1.
Laminate properties: self-extinguishing time 17 seconds.

EXAMPLE VI

Varnish solids: Resin B, 19% of chlorinated polyphenyl A, and 9% of the phosphate employed in Example IV.
Laminate properties:

| | |
|---|---|
| Self-extinguishing time, seconds | 16 |
| Dielectric constant | 4.45 |
| Dielectric constant (D24/23) | 4.57 |
| Power factor | 0.0321 |
| Power factor (D24/23) | 0.0327 |
| Punching | 95 |

EXAMPLE VII

Varnish solids: Resin B, 19% of chlorinated polyphenyl B, and 9% of the phosphate employed in Example IV.
Laminate properties:

| | |
|---|---|
| Self-extinguishing time, seconds | 9 |
| Dielectric constant | 4.49 |
| Power factor | 0.0337 |
| Punching | 95 |

The laminates prepared from the varnishes of the following examples also are self-extinguishing laminates having good electrical and punching properties.

EXAMPLE VIII

Varnish solids: Resin B, 19% of chlorinated polyphenyl C, and 9% of a phosphate corresponding to the formula:

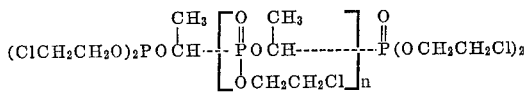

wherein $n$ has an average value of 1.

EXAMPLE IX

Varnish solids: Resin A, 24% of chlorinated polyphenyl A, and 4% of a phosphate corresponding to the formula:

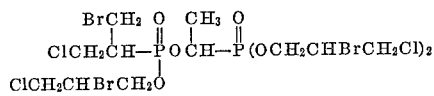

EXAMPLE X

Varnish solids: Resin C, 17% of chlorinated polyphenyl C, and 6% of a phosphate corresponding to the formula:

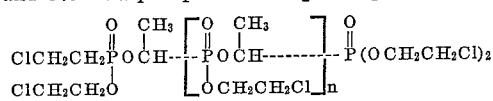

wherein $n$ has an average value of 2.

EXAMPLE XI

Varnish solids: Resin B, 15% of chlorinated polyphenyl A, and 7% of a phosphate corresponding to the formula:

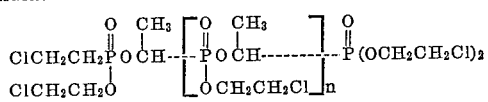

wherein $n$ has an average value of 4.

EXAMPLE XII

Varnish solids: Resin B, 19% of chlorinated polyphenyl A, and 9% of a phosphate corresponding to the formula:

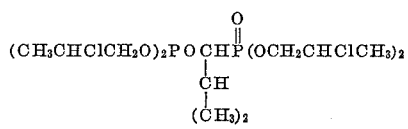

EXAMPLE XIII

Varnish solids: Resin B, 19% of chlorinated polyphenyl A, and 9% of a phosphate corresponding to the formula:

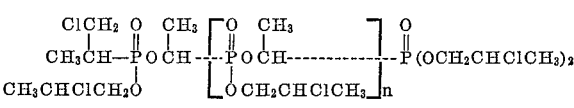

wherein $n$ has an average value of 2.

This invention is directed to a flame-retardant laminate and a particular phenolic resin system which is suitable for preparing the flame-retardant laminate. The flame-retardant laminate of this invention consists of at least two sheets of cellulosic paper which has been impregnated with 25–75 weight percent and preferably 55–65 weight percent of a particular phenolic resin system based on the weight of the cellulosic paper wherein the phenolic resin system has been advanced to an infusible state. The phenolic resin system of this invention consists of an admixture of (1) a phenolic resin prepared by the process of (a) reacting 100 parts by weight of a phenol with 5–70 parts by weight of styrene at 25–145° C. under acidic conditions, (b) reacting the product of step (a) with 10–150 parts by weight of a vegetable drying oil at 150–180° C. under acidic conditions, and (c) reacting the product of step (b) with about 15–55 parts by weight of an aldehyde at 70–100° C. under basic conditions, (2) 5–60 weight percent based on the weight of a chlorinated polyphenol having no flash point below its boiling point and (3) 3–40 weight percent based on the weight of (1) of a particular phosphate.

Chlorinated polyphenyls utilizable in the practice of the invention are those chlorinated polyphenyls which have no flash point below their boiling points. Such chlorinated polyphenyls as are obtained by the chlorination of terphenyl are especially satisfactory for use, although, as shown in the specific examples, products obtained by the chlorination of biphenyl or of biphenyl/terphenyl mixtures are also suitable. The amount of chlorinated polyphenyl employed should be in the range of 5–60%, preferably 12–28%, based on the weight of phenolic resin solids. It is conveniently incorporated into the phenolic resin composition in the form of a solution in an organic solvent, but it can, of course, be added in any manner which will permit thorough admixture with the phenolic resin.

The halogen-containing phosphate is a member of the group consisting of:

(a), (b), (c)

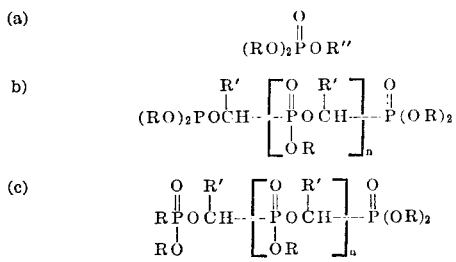

and (d) mixtures thereof; wherein in each of the above formulas R and R" representing a haloalkyl radical containing 2–3 carbon atoms, R' representing an alkyl radical containing 1–3 carbon atoms, and $n$ representing an average numerical value of 0–4. The phosphates shown in the specific examples are exemplary of particularly suitable components of the flame-retardant system. Another especially useful phosphate corresponding to Formula (a) is tris(dibromopropyl) phosphate.

Phosphates corresponding to Formula (b) are conveniently prepared by reacting $PCl_3$ or $PBr_3$ with an epoxy compound, such as ethylene oxide, propylene oxide, epichlorohydrin, etc., in a mol ratio in the range of about 2:4.33 to 2:5, and then reacting this intermediate product with an alkanal containing 2–4 carbon atoms to form a product in which the average value of $n$ is dependent on the mol ratio of phosphorous trihalide to epoxy compound. This average value of $n$ ranges from 0 (when 5 mols of epoxy compound are reacted with 2 mols of phosphorous trihalide) to about 4 (when 4.33 mols of epoxy compound are reacted with 2 mols of phosphorous trihalide).

Phosphates corresponding to Formula (c) are conveniently prepared by heat-isomerization of the phosphates corresponding to Formula (b). Phosphates corresponding to Formulas (b) and (c) and the preparation of such phosphates are more completely described in applications S.N. 780,262 (filed December 15, 1958) now U.S. Patent Number 3,014,951; S.N. 820,618 (filed December 16, 1958) now U.S. Patent Number 3,014,954, and S.N. 828,464 (filed July 21, 1959) now U.S. Patent Number 3,014,956, all filed in the name of Gail H. Birum which were copending with application Serial Number 122,621 (filed July 10, 1961) from which the present application is a continuation-in-part.

The amount of phosphate employed as a component of the present flame-retardant systems should be in the range of 3–40%, preferably 5–14%, based on the weight of phenolic resin solids. The particular amount of phosphate employed in any specific instance is, of course, dependent on the particular phosphate employed and on the properties desired for the final product. Ordinarily, the phosphates containing larger amounts of phosphorus can be expected to be more efficient flame retardants than those containing smaller amounts of phosphorus, and bromine-containing phosphates can be expected to be more efficient than the phosphates containing chlorine as the only halogen.

The flame retardant laminates of this invention as stated previously consist of at least two sheets of cellulosic paper. The cellulosic paper employed herein may be first preimpregnated with a phenol-formaldehyde resin to the extent of 10–18 weight percent based on the weight of the cellulosic paper. This preimpregnated paper insures that the fibers are protected with the phenol-formaldehyde resin. The preimpregnated paper may be further impregnated with the phenolic resin system of this invention. The laminates so prepared may be prepared by pressing the assembly of cellulosic sheets at a pressure of about 1000–2500 p.s.i. and at a temperature of 130–180° C. for at least 10 minutes.

In another embodiment of this invention, cellulosic paper impregnated with the phenolic resin system set forth herein may be used to prepare decorative laminates which would have excellent flame retardant properties. The cellulosic sheets would be used as what is commonly called the core stock of the decorative laminate. The core stock of the decorative laminate would consist of an assembly of about 3–7 sheets of cellulosic paper impregnated with the phenolic resin system of this invention. Superimposed on top of the core stock to prepare a decorative laminate would be a print sheet impregnated with a melamine-formaldehyde resin and an overlay sheet impregnated with a melamine-formaldehyde resin. Such a decorative laminate would have excellent flame retardant properties.

It is obvious that many variations can be made in the products and processes set forth above without departing from the spirit and scope of this invention.

What is claimed is:

1. A flame retardant laminate consisting of at least 2 sheets of cellulosic paper impregnated with 25–75 weight percent of a phenolic resin system based on the weight of the cellulosic paper and wherein the phenolic resin system has been advanced to an infusible state; said phenolic resin system consisting of in admixture (1) a phenolic resin prepared by the process of (a) reacting 100 parts by weight of a phenol with 5–70 parts by weight of styrene at 25–145° C. under acidic conditions; (b) reacting the product of Step (a) with 10–150 parts by weight of a vegetable drying oil at 150–180° C. under acidic conditions; and (c) reacting the product of Step (b) with about 15–55 parts by weight of an aldehyde at 70–100° C. under basic conditions, and (2) 5–60 weight percent based on the weight of (1) of a chlorinated polyphenyl having no flash point below its boiling point and (3) 3–40 weight percent based on the weight of (1) of a phosphate of the group consisting of:

(a), (b), (c)

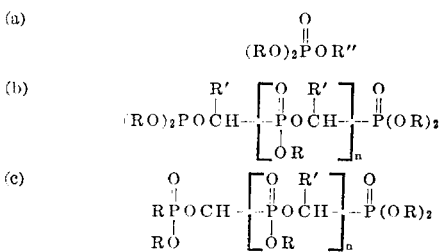

wherein in each of the above formulas R and R" represent a haloalkyl radical containing 2–3 carbon atoms, R' represents an alkyl radical containing 1–3 carbon atoms, and $n$ represents an average numerical value of 0–4.

2. The laminate of claim 1 wherein the cellulosic paper is alpha cellulose paper.

3. The laminate of claim 1 wherein the paper is impregnated with 55–65 weight percent of the phenolic resin system.

References Cited

UNITED STATES PATENTS

| | | | |
|---|---|---|---|
| 1,295,230 | 2/1919 | Stevenson | 161—259 |
| 2,414,415 | 1/1947 | Rhodes | 161—259 |
| 3,014,951 | 12/1961 | Birum | 252—8.1 |
| 3,014,954 | 12/1961 | Birum | 252—8.1 |
| 3,014,956 | 12/1961 | Birum | 252—78 |
| 3,228,899 | 1/1966 | Elmer et al. | 260—19 |

(Other references on following page)

OTHER REFERENCES

The Aroclors, Bulletin of Monsanto Chemical Co., St. Louis Mo., pages 7, 15, and 19 cited of interest.

Duffin, Laminated Plastics, Reinhold Pub. Co., (1958), pages 89, 90, 91 and 203 relied on.

Penning, "Physical Characteristics and Commercial Possibilities of Chlorinated Diphenyl, "Industrial and Engineering Chemistry, vol. 22, No. 11, November 1930, pages 1180–1182.

DONALD E. CZAJA, *Primary Examiner.*

F. McKELVEY, *Assistant Examiner.*